(12) United States Patent
Dong et al.

(10) Patent No.: US 9,104,729 B2
(45) Date of Patent: Aug. 11, 2015

(54) QUERYING SPATIAL EVENTS IN A VEHICLE NETWORK, AND OPTIMIZED QUERIER

(71) Applicant: International Business Machines Corporation, Armonk, NY (US)

(72) Inventors: Wei Shan Dong, Beijing (CN); Ning Duan, Shanghai (CN); Ke Hu, Beijing (CN); Li Li, Beijing (CN); Wei Sun, Beijing (CN); Xi Sun, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/798,987

(22) Filed: Mar. 13, 2013

(65) Prior Publication Data

US 2013/0262434 A1 Oct. 3, 2013

(30) Foreign Application Priority Data

Mar. 31, 2012 (CN) .......................... 2012 1 0092335

(51) Int. Cl.
*G06F 17/30* (2006.01)

(52) U.S. Cl.
CPC .... *G06F 17/30471* (2013.01); *G06F 17/30241* (2013.01); *G06F 17/30477* (2013.01)

(58) Field of Classification Search
CPC .................. Y10S 707/99933; G06F 17/30241; G06F 17/30477; G01C 21/32
USPC .................................................... 707/722, 724
See application file for complete search history.

(56) References Cited

U.S. PATENT DOCUMENTS

| | | | |
|---|---|---|---|
| 5,948,040 | A | 9/1999 | DeLorme et al. |
| 6,321,158 | B1 | 11/2001 | DeLorme et al. |
| 6,823,256 | B1 | 11/2004 | Burt |
| 7,475,060 | B2 | 1/2009 | Toyama et al. |
| 7,526,492 | B2 | 4/2009 | Mikuriya et al. |
| 2010/0228467 | A1 | 9/2010 | Wolfe |
| 2011/0251790 | A1 | 10/2011 | Liotopoulos et al. |

FOREIGN PATENT DOCUMENTS

| | | |
|---|---|---|
| WO | 2009145609 A1 | 12/2009 |
| WO | 2011026338 A1 | 3/2011 |

*Primary Examiner* — Cheryl Lewis
(74) *Attorney, Agent, or Firm* — Cantor Colburn LLP

(57) ABSTRACT

A method of querying spatial events in a vehicle network includes receiving, by a processing device, a query condition of a user; in response to reception of the query condition of the user, determining context information of a position where the user locates; and according to the query condition of the user and the context information of the position where the user locates, querying an index table recording correspondence between terminal nodes of roads in a road map and spatial events to obtain spatial events meeting the query condition of the user.

12 Claims, 5 Drawing Sheets

QUERYING SPATIAL EVENTS IN A VEHICLE NETWORK, AND OPTIMIZED QUERIER

PRIORITY

This application claims priority to Chinese Patent Application No. 201210092335.1, filed 31 Mar. 2012, and all the benefits accruing therefrom under 35 U.S.C. §119, the contents of which in its entirety are herein incorporated by reference.

BACKGROUND

The present invention generally relates to a vehicle networking system, and more specifically, to a method of querying spatial events in a vehicle network and an optimized querier, an index creating method and an index creator, a database system with the index creator, and a vehicle network server with the optimized querier.

A vehicle network refers to a system which implements comprehensive sensing of roads and traffic through employing advanced sensor technology, network technology, computing technology, etc., to realize data interaction, and thus road traffic control and management. In order to achieve efficient road management, it is required to provide efficient database management and maintenance for spatial events in the vehicle network, so as to allow users to query spatial events in the vehicle network in real time rapidly.

In existing vehicle network systems, spatial events are mainly managed using grid index and R-tree index. FIG. 1 shows a schematic diagram of a method in the prior art of indexing and querying spatial events through grid index. In FIG. 1, a map containing road information and spatial events (e.g., a traffic accident occurred at a place, or a call for a taxi by a passenger at a place) is shown on the left, and an enlarged view of a dashed circle in the left view is shown on the right. Circles in the right view represent spatial events. Those spatial events are divided into grids. An index structure is created, so that when a user want to query spatial events, a certain-sized grid is first retrieved according to the query condition, then all spatial events in the grid are filtered according to the query condition. For example, all spatial events meeting a condition in a certain-sized grid are found at first, for example, 4 spatial events in a dashed block of the right view. Then, those spatial events are further filtered according to a query condition to obtain spatial events meeting the query condition.

In order to further query the accurate position of a spatial event, a located grid can be hierarchically subdivided in the space to locate a sub-grid where the spatial event locates. Those spatial-divided grids and sub-grids form an index, by which users can locate accurate positions of spatial events.

However, in such a method, when an index structure of spatial events is created, only spatial distances between positions of user vehicles and positions where those spatial events locate, but no actual reachable information of user vehicles with respect to the positions where the spatial events locate, are considered. For example, some events in the 4 spatial events above may not be reached directly by a user's vehicle without making a turn, which leads to an actual distance from the user's vehicle to a spatial event far longer than a distance specified by a query condition. In this case, further filtering may consume more computing resources of the system, and even no useful query results may be obtained. When the number of user vehicles is larger and the number of spatial events becomes larger, such index structure may exhibit a trend of exponential growth with the increase of vehicles and spatial events, lowering computing speed of the system, as a result, leading to slower responses to index queries, and thus, unable to satisfy real-time query requirement of users.

SUMMARY

In one embodiment, a method of querying spatial events in a vehicle network includes receiving, by a processing device, a query condition of a user; in response to reception of the query condition of the user, determining context information of a position where the user locates; and according to the query condition of the user and the context information of the position where the user locates, querying an index table recording correspondence between terminal nodes of roads in a road map and spatial events to obtain spatial events meeting the query condition of the user.

In another embodiment, an optimized querier for querying spatial events in a vehicle network includes a receiving unit, implemented by a processing device, configured to receive a query condition of a user; a context information collector, configured to, in response to reception of the query condition, determine context information of a position where the user locates; and a spatial event querier, configured to, according to the query condition of the user and the context information of the position where the user locates, query an index table recording correspondence between terminal nodes of roads in a road map and spatial events to obtain spatial events meeting the query condition of the user.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention. Through the more detailed description of some illustrative embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
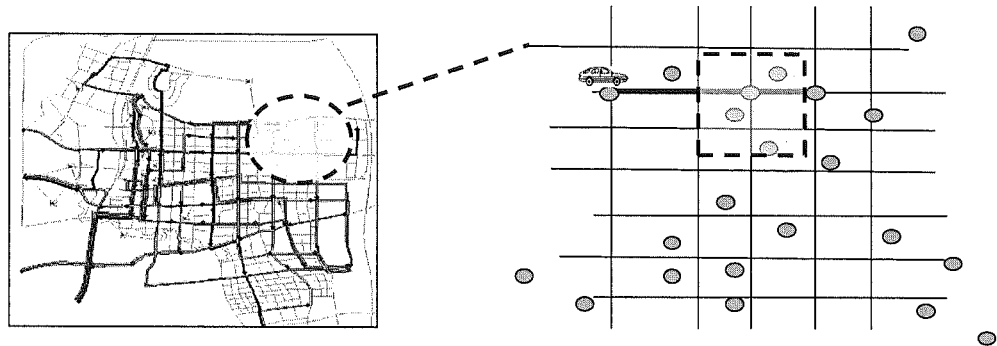
FIG. 1 shows a schematic view of a grid index method employed in the prior art.

According to one aspect, a method of querying spatial events in a vehicle network is provided, comprising: receiving a query condition of a user; in response to the reception of the query condition, determining context information of a position where the user locates; according to the query condition of the user and the context information of the position where the user locates, querying on an index table recording correspondence between terminal nodes of roads of a road map and spatial events to obtain spatial events meeting the query condition of the user.

According to another aspect, an optimized querier for querying spatial events in a vehicle network is provided, comprising: a receiving unit, configured to receive a query condition of a user; a context information collector, configured to in response to the reception of the query condition, determine context information of a position where the user locates; a spatial event querier, configured to according to the query condition of the user and the context information of the position where the user locates, query an index table recording correspondence between terminal nodes of roads of a road map and spatial events to obtain spatial events meeting the query condition of the user.

According to still another aspect, an index creating method is provided, comprising: receiving change of spatial events; receiving a road map and extracting road network information from the road map; dynamically maintaining an index table recording correspondence between terminal nodes of roads of the road map and spatial events according to the change of the spatial events and the road network information; setting index reachable distances, and for the terminal nodes of the roads, recording all spatial events having reachable distances to those terminal nodes falling into the index reachable distances.

According to still another aspect, an index creator is provided, comprising: a spatial event change receiver, configured to receive change of spatial events; a road network information extractor, configured to receive a road map and extract road network information from the road map; reachable distance calculating and index maintaining unit, configured to dynamically maintain an index table recording correspondence between terminal nodes of roads of the road map and spatial events according to the change of the spatial events and the road network information, wherein the index table records correspondence between terminal nodes of roads of the road map and spatial events by setting index reachable distances, and for the terminal nodes of the roads, recording all spatial events having reachable distances to those terminal nodes falling into the index reachable distances.

The embodiments also provide a database system with the index creator according to the above aspect.

The embodiments also provide a vehicle network server with the optimized querier and database system according to the above aspects.

According to an aspect, the time of spatial event filtering can be greatly shortened, so that the efficiency of spatial event query can be greatly improved.

According to another aspect, it is better adaptive to occurrence and vanishing of dynamical events, improving the location-query performance of dynamical-vanishable events, so that more rapid responses and more accurate query results can be provided, resulting in better adaptation to mobile query requirements.

A problem to be addressed in this invention is to make an improvement to the prior art through providing a novel index creating method and an index creator, a method based on a created index structure (also referred to as "index table") and an optimized querier.

The following provides a lot of specific details to help understanding this invention. However, it is obvious to those skilled in the art that, it cannot influence understanding this invention without these specific details. It is further appreciated that any specific terms provided below are for easy description, and thus this invention should not be only limited to any particular uses which these terms express and/or imply.

Figure 2:
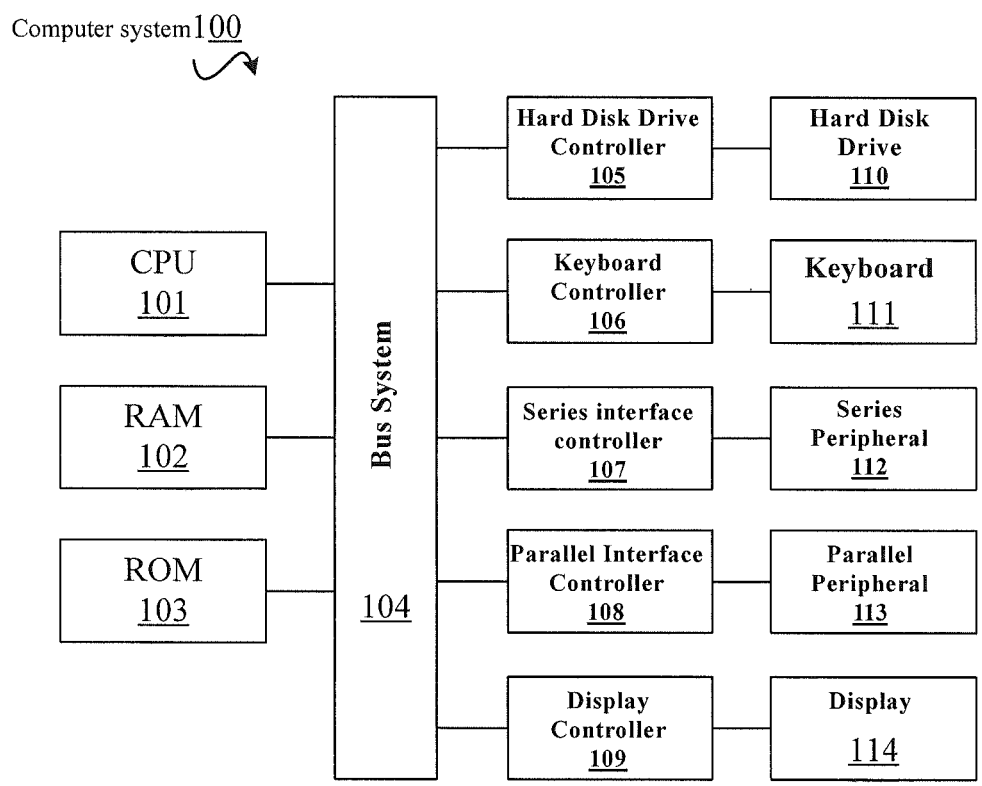
FIG. 2 shows a block diagram of an exemplary computing system suitable for the implementation of an embodiment.

FIG. 2 shows an exemplary computer system 100 which is applicable to implement the embodiments of the present invention. As shown in FIG. 2, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 2 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
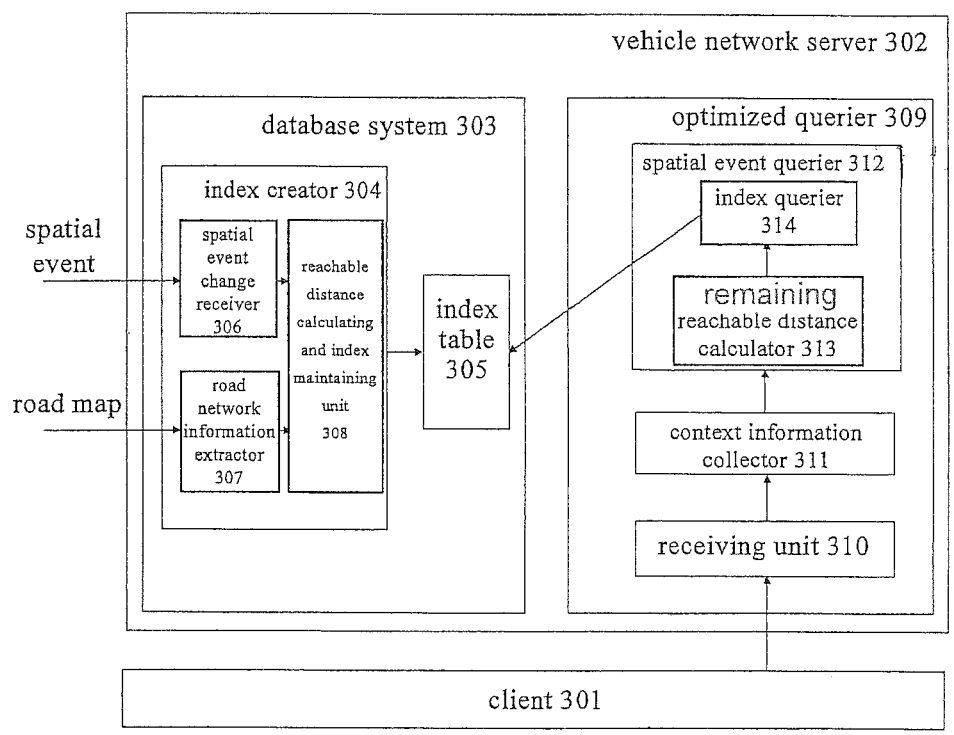
FIG. 3 shows a block diagram of a vehicle network server according to an exemplary embodiment.

Referring now to FIG. 3, there is shown a block diagram of a vehicle network server 302 according to an exemplary embodiment. As shown in FIG. 3, the vehicle network server 302 may include a database system 303 and an optimized querier 309 for querying spatial events in a vehicle network. The vehicle network server 302 may be connected to a client 301. The database system 303 may include an index creator 304 and an index table 305.

The index creator 304 may include: a spatial event change receiver 306, configured to receive change of spatial events; a road network information extractor 307, configured to receive a road map and extract road network information from the road map; reachable distance calculating and index maintaining unit 308, configured to dynamically maintain an index table 305 recording correspondence between terminal nodes of roads of the road map and spatial events according to the change of the spatial events and the road network information.

Figure 4:
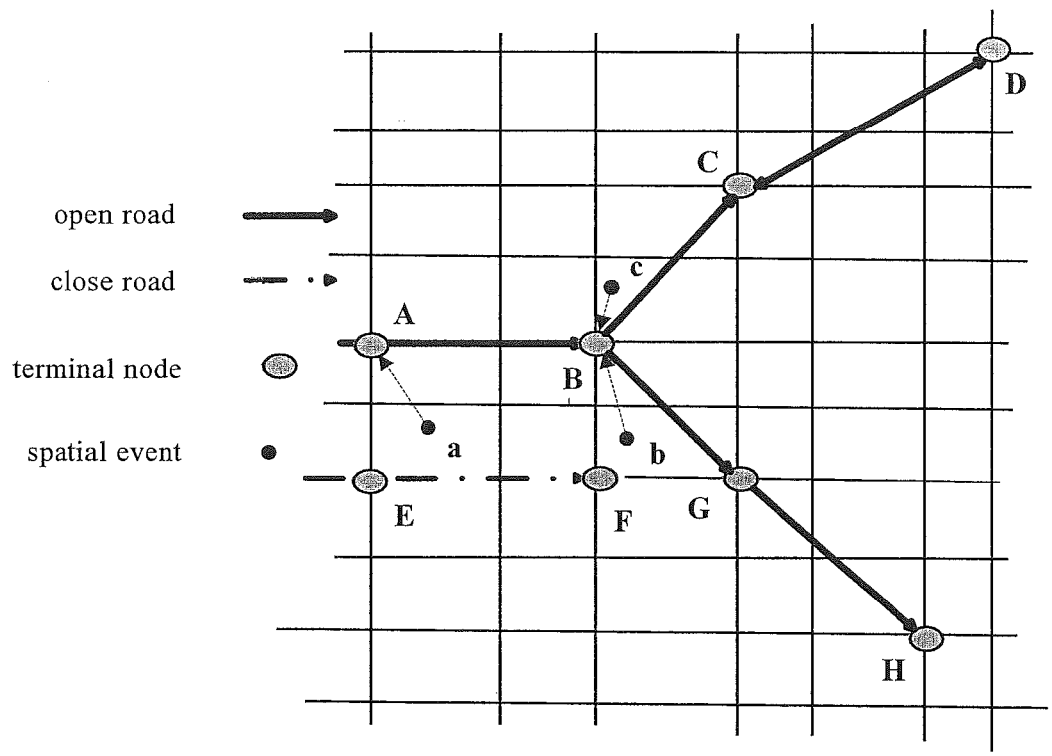
FIG. 4 shows a schematic view for index creating according to an exemplary embodiment, containing a road map and spatial event information.

A map identifying allowed driving directions of roads, and identifying whether roads are open roads or close roads is referred to as a road map. As shown in FIG. 4, open roads are represented by rough lines, and close roads are represented by dotted lines, wherein an open road is a road with open sides, which can be entered through either side directly. As shown in FIG. 4, A-B is an open road. A close road is a road with close sides, which can be entered through neither side directly. As shown in FIG. 4, E-F is a close road. A road with an arrow representing only one driving direction allowed along the arrow is referred to as a one-way road. A road with two arrows representing two driving directions allowed along the arrows is referred to as a two-way road.

In the road map, nodes identifying the two terminals of a road are called as terminal nodes. A start along the driving direction of a road is called as the start node of the road. An end along the driving direction of a road is called as the ending node of the road. As shown in FIG. 4, A is the start node of road A-B and B is its ending node. The portion between two terminal nodes is a road. A road shown in the road map can be different with what it is in practice. A real road can be separated into different roads in the road map. For example, in practice, B-H in FIG. 4 is a straight road, which however be separated into two roads B-G, G-H in the road map.

The optimized querier 309 may include a receiving unit 310, context information collector 311 and a spatial event querier 312. The receiving unit 310 may be configured to receive a user query condition. The user query condition may include an expected reachable distance, representing the maximum distance of spatial events to be searched by the user to a position where the user locates.

The context information collector 311 may be configured to, in response to the user query condition, determine context information of a position where the user locates. The context information of a position where the user locates may include a road where the user locates and the ending node of the road.

The spatial event querier 312 may be configured to, according to the user query condition and the context information of the position where the user locates, query an index table 305 recording correspondence between terminal nodes of roads of a road map and spatial events to obtain spatial events meeting the query condition of the user. The spatial event querier 312 may further include a remaining reachable distance calculator 313 and an index querier 314.

The remaining reachable distance calculator 313 is configured to, according to the user query condition and the context information of the position where the user locates, determine a remaining reachable distance, indicating, in order to meet the expected reachable distance in the user query condition, the maximum distance of spatial events expected to be searched to the ending node of the road where the user currently locates.

The remaining reachable distance calculator 313 may calculate a distance from a current position of the user to the ending node of the road based on the road where the user locates and the ending node thereof, subtract the distance between the current position of the user and the ending node of the road from the expected reachable distance to obtain the remaining reachable distance.

The index querier 314 is configured to query the index table 305 according to the remaining reachable distance to obtain spatial events meeting the user query condition. The index querier 314 may search the minimum index reachable distance larger than or equal to the remaining reachable distance in the index table 305, and search spatial events corresponding to the ending node and the minimum index reachable distance.

Figure 6:
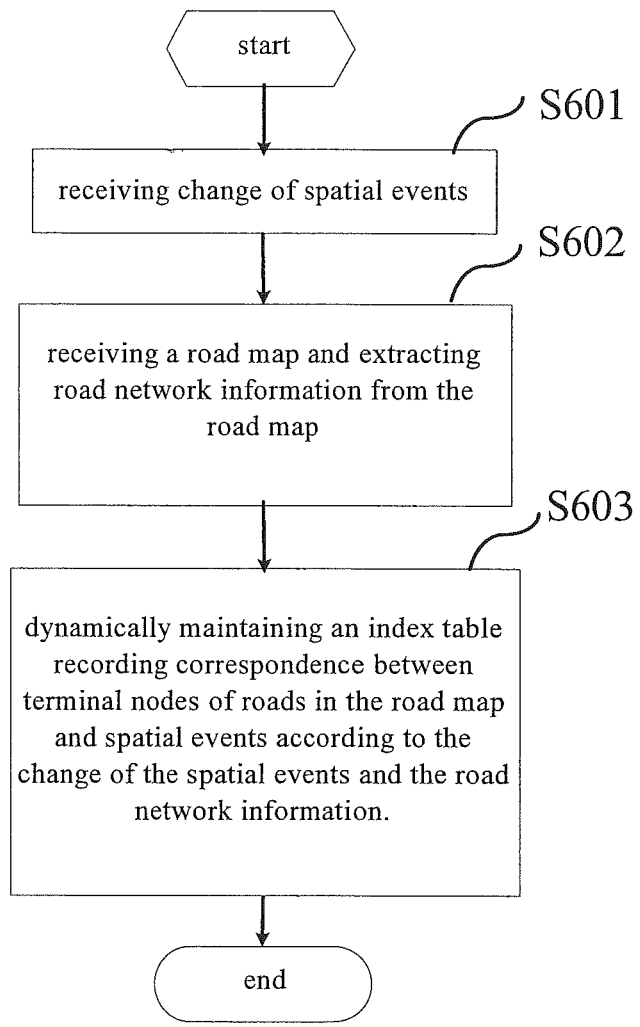
FIG. 6 shows a flowchart of an index creating method according to an exemplary embodiment.

FIG. 6 shows a flowchart of an index creating method according to an exemplary embodiment. As shown in FIG. 6, the index creating method may include the following operations: receiving change of spatial events S601; receiving a road map and extracting road network information from the road map S602; dynamically maintaining an index table recording correspondence between terminal nodes of roads of the road map and spatial events according to the change of the spatial events and the road network information S603.

Below, index table creation according to an exemplary embodiment will be illustrated in connection of FIG. 4 and Table 1. FIG. 4 shows a schematic view containing a road map and spatial event information for index creating according to an exemplary embodiment. Table 1 shows an index table according to an exemplary embodiment.

TABLE 1

| Terminal node | Index reachable distance (150 m) | Index reachable distance (300 m) |
|---|---|---|
| A | a | a |
| B | a, b, c | a, b, c |
| C | b, c | a, b, c |
| D |  | b, c |
| E |  |  |
| F |  |  |
| G | b, c | a, b, c |
| H |  | b, c |

Below, the creating process of Table 1 will be described.

First, an index reachable distance, for example, 150 m or 300 m in Table 1, is set. With respect to a terminal node of a road, spatial events having reachable distances to the terminal node falling into the index reachable distance are recorded. In response to change of spatial events being new generation of a spatial event, for example, spatial event a, b or c, the following actions I) to VII) may be executed.

An open road with the shortest distance to the spatial event is searched in the road map. As shown in FIG. 4, for the spatial event a, road E-F is the road with the shortest distance to a, however it is a close road. Road A-B is the road with the second shortest distance to a. Because road A-B is an open road, it is the open road with the shortest distance to a.

The spatial event is assigned to the start node of the open road, and the distance between the spatial event and the start node is calculated as a accumulated reachable distance. For example, spatial event a may be assigned to the start node of open road A-B. Because road A-B is a one-way road, A is the start node of A-B, spatial event a is assigned to start node A. In FIG. 4, the distance between spatial event a and start node A is calculated as 50 m.

If the accumulated reachable distance is less than or equal to one or more index reachable distances in the index table, for each of the one or more index reachable distances, the spatial event is recorded in the index table in correspondence with the start node and the index reachable distance. In FIG. 4, the accumulated reachable distance 50 m is less than or equal to one or more index reachable distances 150 m, 300 m in the index table. Thus, for each of the one or more index reachable distances 150 m, 300 m, the spatial event is recorded in the index table in correspondence with start node A and the index reachable distances 150 m or 300 m, as shown in the second row of Table 1.

The distance between the start node and the ending node of the road is added to the accumulated reachable distance to obtain a new accumulated reachable distance. For example, in FIG. 4, since the distance between terminal node A and terminal node B is 100 m, the new accumulated reachable distance obtained through addition is 150 m.

It is determined whether the new accumulated reachable distance is still less than or equal to the index reachable distance. If the new accumulated reachable distance is still less than or equal to the index reachable distance, The spatial event is recorded in the index table in correspondence with the ending node and the index reachable distance, and the accumulated reachable distance is updated with the new accumulated reachable distance for action IV). It can be seen that the new accumulated reachable distance 150 m is still less than or equal to the index reachable distances 150 m, 300 m, thus spatial event a is recorded in the index table in correspondence with terminal node B and the index reachable distances 150 m, 300 m, as shown at row 3 of Table 1. Then, the accumulated reachable distance is updated with the new accumulated reachable distance 150 m for action IV).

The ending node is treated as the start node of a next road, actions IV) to VI) are repeated for the next road until the new accumulated reachable distance is determined as exceeding the index reachable distances. For example, ending node B is taken as the start node of a next road B-C. Because the distance between terminal node B and terminal node C is 100 m, the new accumulated reachable distance obtained through addition is 250 m. The new accumulated reachable distance 250 m is larger than index reachable distance 150 m but less than index reachable distance 300 m, thus spatial event a can be recorded in the index table in correspondence with terminal node C and index reachable distance 300 m as shown at row 4 and column 3 of Table 1. Then, the accumulated reachable distance is updated with new accumulated reachable distance 250 m for action IV). Terminal node C is then taken as the start node of a next road C-D. Because the distance between terminal node D and terminal node C is 150 m, the new accumulated reachable distance obtained through addition is 400 m. The new accumulated reachable distance 400 m is larger than the index reachable distances 150 m, 300 m, thus spatial event a is not recorded in the index table in correspondence with terminal node D and the index reachable distances.

Furthermore, because the distance between terminal node B and terminal node G is 90 m, the new accumulated reachable distance obtained through addition is 240 m. The new accumulated reachable distance 240 m is larger than index reachable distance 150 m but less than index reachable distance 300 m, thus spatial event a can be recorded in the index table in correspondence with terminal node G and index reachable distance 300 m as shown at row 7 and column 3 of Table 1. Then, the accumulated reachable distance is updated with new accumulated reachable distance 240 m for action IV). Because the distance between terminal node G and terminal node H is 100 m, the new accumulated reachable distance obtained through addition is 340 m. The new accumulated reachable distance 340 m is larger than the index reachable distances 150 m, 300 m, thus spatial event a is not recorded in the index table in correspondence with the terminal node H and the index reachable distances.

Thus, spatial event a can be recorded in the index table in correspondence with terminal nodes and index reachable distances therein. Similarly, spatial events b, c can be recorded in the index table in correspondence with various terminal nodes and index reachable distances. For example, in FIG. 4, road B-G is the open road with the shortest distance to b, the distance between spatial event b and start node B is 50 m. After executing above actions II) to VII), spatial event b can be recorded in rows 3, 4, 5 and column 3, rows 7, 8 and column 3 of Table 1. Road B-C is the open road with the shortest distance to c, and the distance between spatial event c and start node B is 25 m. After executing above actions II) to VII), spatial event b also can be recorded in rows 3, 4, 5 and column 3, rows 7, 8 and column 3 of Table 1.

Thus, for each of road terminal nodes A, B, C, D, E, F, G, H of FIG. 4, with respect to various index reachable distances 150 m, 300 m, all spatial events a, b, c having reachable distances to the terminal node within the index reachable distances have been correspondingly recorded. Also, a spatial event can be removed from the index table in response to change of the spatial event of removing the spatial event. For example, if spatial event a has finished, it can be removed from Table 1.

Further, for an index table, it is also possible to remove repeated records of spatial events within different index reachable distances, because spatial events within a logically shorter index reachable distance (such as 150 m) are naturally within a logically longer index reachable distance (such as 300 m). As shown in Table 2, for example, although spatial event a is only recorded in correspondence with the index reachable distance 150 m for terminal node A, and is not recorded in correspondence with the index reachable distance 300 m, in practice however, spatial event a should be considered as within the index reachable distance 300 m either. Similarly, for terminal node C, not only spatial event a but also spatial events b, c recorded corresponding to the index reachable distance 150 m are within the index reachable distance 300 m.

TABLE 2

| Terminal node | index reachable distance(150 m) | index reachable distance(300 m) |
|---|---|---|
| A | a (50 m) | |
| B | a (150 m), b (50 m), c (25 m) | |
| C | b (150 m), c (125 m) | a (250 m) |
| D | | b (300 m), c (275 m) |
| E | | |
| F | | |
| G | b (140 m), c (115 m) | a (240 m) |
| H | | b (240 m), c (215 m) |

Furthermore, for each spatial event, an accumulated reachable distance to each terminal node is also recorded in the index table. This information can be provided to users along with returned query results. The accumulated reachable distance of each spatial event to each terminal node can be identified after the spatial event in the index table. For example, as shown in Table 2, for terminal node A, spatial a (50 m) is recorded.

Further, spatial events can be recorded in an order of accumulated reachable distances. For example, as to terminal node B in Table 2, spatial events within the index reachable distance 150 m can be recorded as c (25 m), b (50 m), a (150 m) in descending order of the accumulated reachable distances between those spatial events and terminal node B. Obviously, as to Table 1, spatial events also can be recorded in an order of accumulated reachable distances.

Those skilled in the art may understand that the description above is merely an embodiment. Through reading the above embodiment, those skilled in the art may conceive other particular implementations of index table creating, which are all within the scope and spirit of this disclosure.

Figure 7:
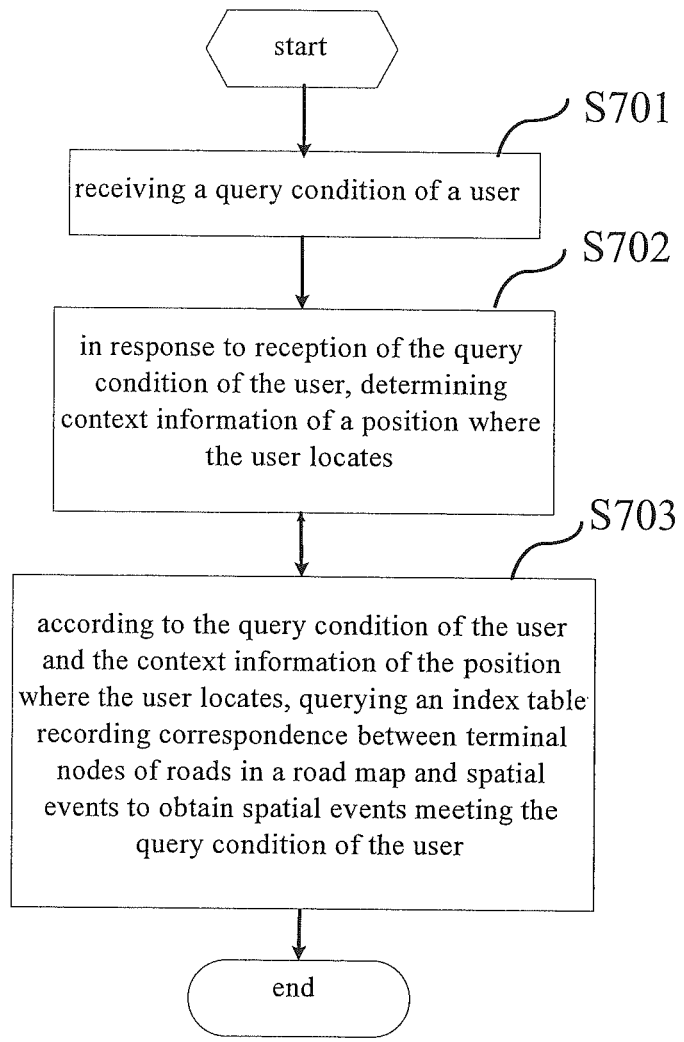
FIG. 7 shows a flowchart of a method of querying spatial events in a vehicle network according to an exemplary embodiment.

FIG. 7 shows a flowchart of a method of querying spatial events in a vehicle network according to an exemplary embodiment. As shown in FIG. 7, a method of querying spatial events in a vehicle network is provided and includes the following operations: receiving a query condition of a user S701; in response to reception of the query condition, determining context information of a position where the user locates S702; according to the query condition of the user and the context information of the position where the user locates, querying on an index table recording correspondence between terminal nodes of roads of a road map and spatial events to obtain spatial events meeting the query condition of the user S703.

Figure 5:
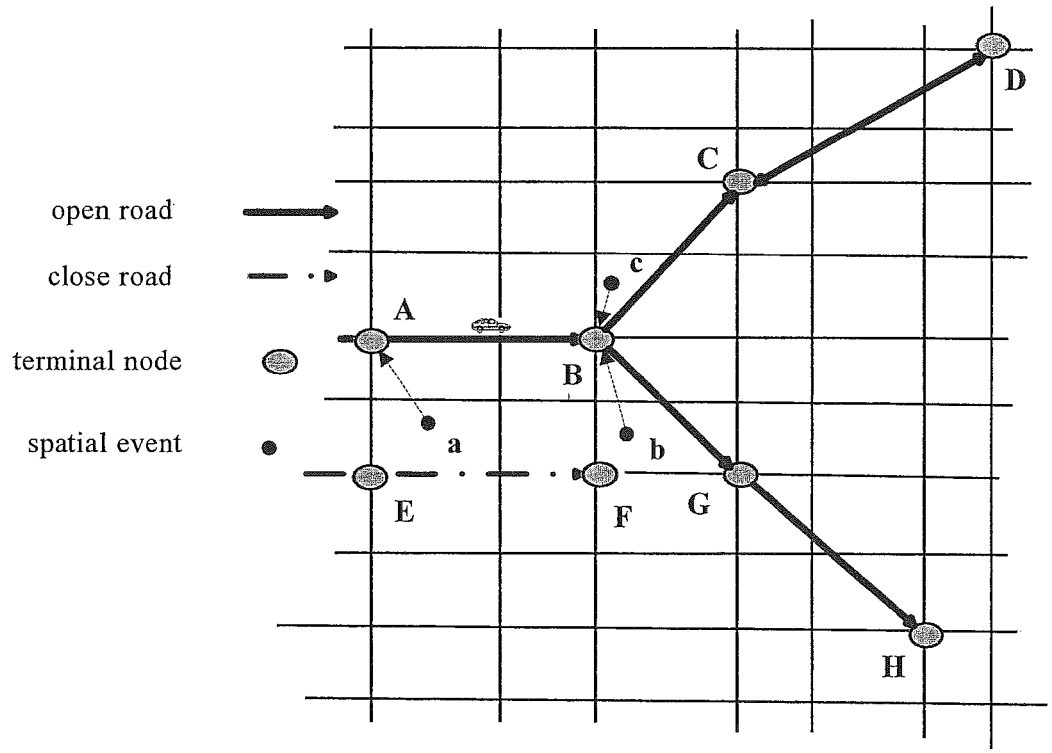
FIG. 5 shows a schematic view for real-time query according to an exemplary embodiment, containing a road map, spatial event information, context information of a position where a user locates.

Below, the real-time query of spatial events in a vehicle network according to an exemplary embodiment will be illustrated in connection with FIG. 5 and Table 1. FIG. 5 shows a schematic view containing a road map, spatial event information, context information of a position where a user locates for real-time query according to an exemplary embodiment.

At block S701, the query condition of the user may include an expected reachable distance, representing the maximum distance to the position where the user locates of spatial events to be searched by the user. For example, the user may want to search spatial events within a reachable distance of 150 m to his location.

At block S702, the context information of the position where the user locates may include a road the user locates and the ending node of the road. For example, as shown in FIG. 5, the user locates on a road A-B. Because road A-B is a one-way road, its ending node is B.

At block S703, according to the user query condition and the context information of the position where the user locates, an index table 1 recording correspondence between terminal nodes of roads of a road map and spatial events is queried to obtain spatial events meeting the query condition of the user.

In an embodiment, a remaining reachable distance is first determined according to the user query condition and the context information of the position where the user locates. The remaining reachable distance represents, in order to meet the expected reachable distance 150 m in the user query condition, the maximum distance from ending node B of road A-B where the user currently locates to spatial events expected to be searched. For example, a distance from a current position of the user to ending node B of the road is calculated based on road A-B where the user locates and ending node B thereof. As shown in FIG. 5, the distance between the user and terminal node B is calculated as 50 m. A remaining reachable distance 100 m can be obtained through subtracting the distance 50 m between the user's current position and ending node B from the expected reachable distance 150 m.

After that, the index table is queried according to the remaining reachable distance to obtain spatial events meeting the user query condition. For example, the minimum index reachable distance larger than or equal to the remaining reachable distance, and spatial events corresponding to the next terminal node and the minimum index reachable distance may be searched in the index table. As shown in Table 1, the minimum index reachable distance larger than or equal to the remaining reachable distance 100 m is 150 m, thus spatial events a, b, c corresponding to terminal node B and the expected reachable distance 150 m can be found, as shown at row 3 and column 2 of Table 1. That is, all spatial events a, b, c meet the user query condition. Then, spatial events meeting the user query condition are filtered.

As described above, through querying a created index table according to the method of the exemplary embodiment, the time of spatial event filtering can be greatly shortened, so that more rapid responses and more accurate query results can be provided for user queries.

Those skilled in the art may understand that the description above is merely an embodiment. Through reading the above embodiment, those skilled in the art may conceive other particular implementations of spatial event query, which are all within the scope and spirit of this disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of querying spatial events in a vehicle network, comprising:
   receiving, by a processing device, a query condition of a user;
   in response to reception of the query condition of the user, determining context information of a position where the user locates; and
   according to the query condition of the user and the context information of the position where the user locates, querying an index table recording correspondence between terminal nodes of roads in a road map and spatial events to obtain spatial events meeting the query condition of the user;
   wherein the query condition of the user comprises an expected reachable distance, representing the maximum distance of spatial events to be searched by the user to a position where the user locates;
   wherein querying an index table recording correspondence between terminal nodes of roads in a road map and spatial events to obtain spatial events meeting the query condition of the user comprises:
   according to the query condition of the user and the context information of a position where the user locates, determining a remaining reachable distance, wherein the context information of a position where the user locates comprises a road where the user locates and the ending node thereof, and the remaining reachable distance indicates, in order to meet the expected reachable distance in the query condition of the user, the maximum distance of spatial events expected to be searched to the ending node of the road where the user currently locates; and
   querying the index table according to the remaining reachable distance to obtain spatial events meeting the query condition of the user;
   and wherein determining the remaining reachable distance comprises calculating a distance from a current position of the user to the ending node of the road where the user locates based on the road and the ending node thereof, subtracting the distance between the current position of the user and the ending node of the road from the expected reachable distance to obtain the remaining reachable distance.

2. The method according to claim 1, wherein the index table records correspondence between terminal nodes of roads in a road map and spatial events by setting an index reachable distance, and for the terminal nodes of the roads, records all spatial events having reachable distances to those terminal nodes falling into the index reachable distance.

3. The method according to claim 1, wherein querying the index table according to the remaining reachable distance comprises searching the minimum index reachable distance larger than or equal to the remaining reachable distance in the index table, and searching spatial events corresponding to the ending node and the minimum index reachable distance.

4. An optimized querier for querying spatial events in a vehicle network, comprising:
   a receiving unit, implemented by a processing device, configured to receive a query condition of a user;
   a context information collector, configured to, in response to reception of the query condition, determine context information of a position where the user locates;
   a spatial event querier, configured to, according to the query condition of the user and the context information of the position where the user locates, query an index table recording correspondence between terminal nodes of roads in a road map and spatial events to obtain spatial events meeting the query condition of the user;
   wherein the query condition of the user comprises an expected reachable distance, representing the maximum distance of spatial events to be searched by the user to a position where the user locates;
   wherein querying an index table recording correspondence between terminal nodes of roads in a road map and spatial events to obtain spatial events meeting the query condition of the user comprises:
   according to the query condition of the user and the context information of a position where the user locates, determining a remaining reachable distance, wherein the context information of a position where the user locates comprises a road where the user locates and the ending node thereof, and the remaining reachable distance indicates, in order to meet the expected reachable distance in the query condition of the user, the maximum distance of spatial events expected to be searched to the ending node of the road where the user currently locates; and
   querying the index table according to the remaining reachable distance to obtain spatial events meeting the query condition of the user;
   and wherein determining the remaining reachable distance comprises calculating a distance from a current position of the user to the ending node of the road where the user locates based on the road and the ending node thereof, subtracting the distance between the current position of the user and the ending node of the road from the expected reachable distance to obtain the remaining reachable distance.

5. The optimized querier according to claim 4, wherein the index table records correspondence between terminal nodes of roads in a road map and spatial events by setting an index reachable distance, and for the terminal nodes of the roads, recording all spatial events having reachable distances to those terminal nodes falling into the index reachable distance.

6. The optimized querier according to claim 5, wherein the query condition of the user comprises an expected reachable distance, representing the maximum distance of spatial events to be searched by the user to a position where the user locates.

7. The optimized querier according to claim 6, wherein the spatial event querier comprises:
   a remaining reachable distance calculator, configured to, according to the query condition of the user and the context information of the position where the user locates, determine a remaining reachable distance, wherein the context information of the position where the user locates comprises a road where the user locates and the ending node thereof, and the remaining reachable distance indicates, in order to meet the expected reachable distance in the query condition of the user, the maximum distance of spatial events expected to be searched to the ending node of the road where the user currently locates;
   an index querier, configured to query the index table according to the remaining reachable distance to obtain spatial events meeting the query condition of the user.

8. The optimized querier according to claim 7, wherein the remaining reachable distance calculator is configured to calculate a distance from a current position of the user to the ending node of the road where the user locates based on the road and the ending node thereof, and subtract the distance between the current position of the user and the ending node of the road from the expected reachable distance to obtain the remaining reachable distance.

9. The optimized querier according to claim 7, wherein the index querier is configured to search the minimum index reachable distance larger than or equal to the remaining reachable distance in the index table, and search spatial events corresponding to the ending node and the minimum index reachable distance.

10. A vehicle network server with an optimized querier according to claim 4.

11. A vehicle network server, comprising:
    a database system and an optimized querier for querying spatial events in a vehicle network;
    wherein the database system comprises:
       a spatial event change receiver, configured to receive change of spatial events;
       a road network information extractor, configured to receive a road map and
       extract road network information from the road map; and
       a reachable distance calculating and index maintaining unit, configured to dynamically maintain an index table recording correspondence between terminal nodes of roads in the road map and spatial events according to the change of the spatial events and the road network information, the index table recording correspondence between terminal nodes of roads in the road map and spatial events by setting index reachable distances, and for the terminal nodes of the roads, recording all spatial events having reachable distances to those terminal nodes falling into the index reachable distances;
    wherein the optimized querier comprises:
       a receiving unit, implemented by a processing device, configured to receive a query condition of a user;
       a context information collector, configured to, in response to reception of the query condition, determine context information of a position where the user locates;
       a spatial event querier, configured to, according to the query condition of the user and the context information of the position where the user locates, query the index table recording correspondence between terminal nodes of roads in a road map and spatial events to obtain spatial events meeting the query condition of the user;
    wherein the query condition of the user comprises an expected reachable distance, representing the maximum distance of spatial events to be searched by the user to a position where the user locates;
    wherein querying the index table recording correspondence between terminal nodes of roads in a road map and spatial events to obtain spatial events meeting the query condition of the user comprises:
       according to the query condition of the user and the context information of a position where the user locates, determining a remaining reachable distance, wherein the context information of a position where the user locates comprises a road where the user locates and the ending node thereof, and the remaining reachable distance indicates, in order to meet the expected reachable distance in the query condition of the user, the maximum distance of spatial events expected to be searched to the ending node of the road where the user currently locates; and
       querying the index table according to the remaining reachable distance to obtain spatial events meeting the query condition of the user;
       and wherein determining the remaining reachable distance comprises calculating a distance from a current position of the user to the ending node of the road where the user locates based on the road and the ending node thereof, subtracting the distance between the current position of the user and the ending node of the road from the expected reachable distance to obtain the remaining reachable distance.

12. The vehicle network server according to claim 11, wherein the reachable distance calculating and index maintaining unit is configured to, in response to change of spatial events being new generation of a spatial event, execute the following actions:
   I) finding an open road with the shortest distance to the spatial event in the road map;
   II) assigning the spatial event to the start node of the open road, and calculating the distance between the spatial event and the start node as an accumulated reachable distance;
   III) if the accumulated reachable distance is less than or equal to one or more index reachable distances in the index table, for each of the one or more index reachable distances, recording the spatial event in the index table in correspondence with the start node and the index reachable distance;
   IV) adding the distance between the start node and the ending node of the road to the accumulated reachable distance to obtain a new accumulated reachable distance;
   V) determining whether the new accumulated reachable distance is still less than or equal to the index reachable distance;
   VI) if the new accumulated reachable distance is still less than or equal to the index reachable distance, recording the spatial event in the index table in correspondence with the ending node and the index reachable distance, and updating the accumulated reachable distance with the new accumulated reachable distance for action IV);

VII) taking the ending node as the start node of a next road, repeating actions IV) to VI) for the next road until the new accumulated reachable distance is determined as exceeding the index reachable distances.

* * * * *